United States Patent [19]

Jones et al.

[11] Patent Number: 5,330,300
[45] Date of Patent: Jul. 19, 1994

[54] ARTICULATED PIVOTING TIE-DOWN DEVICE

[75] Inventors: Leon Jones; Gerald F. Hoffa; David E. Wilson; Les Baych; David Snyder, all of Cedar Rapids, Iowa

[73] Assignee: Columbus McKinnon Corporation, Cedar Rapids, Iowa

[21] Appl. No.: 976,490

[22] Filed: Nov. 16, 1992

[51] Int. Cl.⁵ .............................................. B60P 7/08
[52] U.S. Cl. ....................................... 410/106; 410/101
[58] Field of Search ............... 410/101, 102, 104, 106, 410/107, 109, 110, 112, 114, 108, 116; 24/265 CD, 115 K; 248/499, 503

[56] References Cited

U.S. PATENT DOCUMENTS

| | | | |
|---|---|---|---|
| 2,322,576 | 6/1943 | Huebshman et al. | 410/116 X |
| 2,520,554 | 8/1950 | Logmann et al. | 410/108 |
| 3,070,042 | 12/1962 | Dunlap | 410/110 |
| 3,215,390 | 11/1965 | Shetler | 410/116 |
| 3,685,778 | 8/1972 | Berns | 410/116 |
| 3,831,532 | 8/1974 | Smith et al. | 410/111 X |
| 3,904,154 | 9/1975 | Jones | 410/111 X |
| 4,818,162 | 4/1989 | Zukowski et al. | 410/116 |
| 4,953,820 | 9/1990 | Yoder | 410/110 |
| 5,011,349 | 4/1991 | McAndrews | 410/106 X |

Primary Examiner—Michael S. Huppert
Assistant Examiner—Stephen Gordon
Attorney, Agent, or Firm—Simmons, Perrine, Albright & Ellwood

[57] ABSTRACT

An articulated pivoting tie-down device for securing a cargo to a vehicle comprises a retainer portion secured to a vehicle, a clevis encircled by the retainer portion, a connector having a hook/cable opening and a strap opening, and a pin interconnecting the clevis and the connector and forming a common pivotal axis therebetween. A modified embodiment comprises a pin connecting a clevis and a retainer portion and forming a common pivotal axis therebetween, a connector, and a link, having a generally elliptical cross-section, which interconnects the clevis and the connector such that the clevis and the connector are generally operably co-planar. The clevis is generally semi-elliptical with its major axis parallel to the common pivotal axis. Each embodiment is adapted to maintain relative alignment to resultant binding and dynamic force vectors such that stresses induced by eccentricity are minimized or avoided in the tie-down device, thereby allowing a smaller material cross-section to be used in manufacture of the tie-down device.

2 Claims, 1 Drawing Sheet

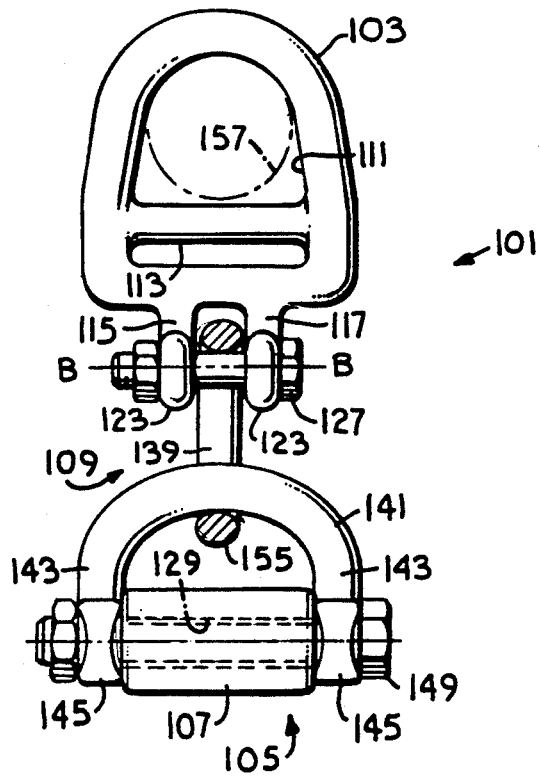

ARTICULATED PIVOTING TIE-DOWN DEVICE

BACKGROUND OF THE INVENTION

1. Field of the Invention

The present invention relates to a tie-down device and, particularly, to an articulated pivoting tie-down device for binding cargo to a vehicle.

2. Description of the Related Art

A common requirement of our society is the need to transport various types of cargo from one place to another. Many of the existing vehicles available for transporting such cargo are of the flat bed type. Many times, however, such cargo is very massive and tends to shift while being transported. Although various types of tie-down straps and cables have been developed to bind such cargo to the flat beds, unfortunately the devices developed to connect the tie-down straps and cables to the vehicle have met only limited success. Such non-articulated and non-pivoting devices can generally non-destructively withstand only forces applied in direct tension, but are not generally economically designed to non-destructively withstand the substantial stresses created by eccentrically applied loads which are generated by crisscross binding, as the cargo shifts while being transported, and by the flexing of the vehicle. In some cases such resultant forces may reach magnitudes in the range of tens of thousands of pounds, or greater.

An alternative would be to use specially designed vehicles which cradle the cargo to prevent shifting thereof. This alternative, however, would generally not be practical economically as the specially designed vehicles would generally have limited application for other usages. What is needed is a tie-down device which can be used to secure massive cargo to a flat bed vehicle and which is economically capable of non-destructively adapting to the substantial stresses created by the resultant horizontal, vertical, and lateral force vectors caused by the loads created by criss-cross binding and the dynamic loading induced by the tendency of cargo to shift and the flexing of the vehicle while in motion.

SUMMARY OF THE INVENTION

An improved articulated pivoting tie-down device is provided which can be used to secure massive cargo to a flat bed vehicle and which is economically capable of non-destructively adapting to the substantial stresses created by the resultant horizontal, vertical, and lateral force vectors caused by the loads created by crisscross binding and the dynamic loading induced by the tendency of cargo to shift, and the flexing of the vehicle while in motion. The device includes a connector having an opening for cables and hooks and another opening for straps, a retainer portion with an orifice and a base for securement to a transporting vehicle, a clevis encircled by the orifice of the retainer portion, and a pin interconnecting the connector and the clevis such that a common pivotal axis is formed therebetween. The connector and the clevis are adapted to operably and generally uninhibitedly pivot relative to the retainer portion in order to reduce stress induced by eccentrically applied loads.

A modified embodiment of an articulated pivoting tie-down device includes a connector having an opening for hooks and cables, a slot for straps, a pair of legs, and a first pin interconnecting the pair of legs such that the first pin is generally parallel to the slot. The modified device also includes a retainer portion, a clevis, and a second pin interconnecting the clevis and the retainer portion such that a common pivotal axis is formed therebetween. The clevis is generally semi-elliptical with its major axis parallel to the common pivotal axis. A link pivotally interconnects the connector and the retainer portion by encircling the first pin and the clevis. The connector and the link of the modified device are adapted to operably and generally uninhibitedly pivot relative to the clevis in order to reduce the stress induced by eccentrically applied loads.

OBJECTS AND ADVANTAGES OF THE INVENTION

Therefore, the principal objects and advantages of the present invention include: providing an articulated pivoting tie-down device for securing cargo to a vehicle that generally aligns itself in the direction of the binding load and dynamic loads caused by shifting cargo and flexing of the vehicle; providing such a device for minimizing eccentric load levels and related stresses developed therein due to forces caused by crisscross binding, shifting of the cargo, and flexing of the vehicle; providing such a device which can be used with hooks, cables or straps; providing such a device which can be adapted to retainer clips on existing vehicles; and generally providing such a device which is efficient and reliable, economical to manufacture, simple to maintain, and which generally performs the requirements of its intended purpose.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 1 is a front elevational view of an articulated pivoting tie-down device, according to the present invention.

FIG. 2 is a side elevational view of the articulated pivoting tie-down device, showing a retainer portion secured to a vehicle and a hook inserted through an opening of a connector of the device.

FIG. 3 is a front elevational view of a modified embodiment of an articulated pivoting tie-down device, according to the present invention.

FIG. 4 is a front elevational view of the modified articulated pivoting tie-down device, showing a link and a connector thereof extending to one side of a clevis thereof.

FIG. 5 is a side elevational view of the modified articulated pivoting tie-down device shown secured to a vehicle, extending upwardly from the vehicle in solid lines, and extending over the vehicle in phantom lines, according to the present invention.

DETAILED DESCRIPTION OF THE INVENTION

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

The reference numeral 1 as used herein generally refers to an articulated pivoting tie-down device for anchoring tie-down cables and straps, with and without a hook, to a vehicle 2 carrying a cargo or load 3 in accordance with the present invention, as shown in FIGS. 1 and 2. The device 1 comprises a connector 4, retaining means 5, such as a retainer portion 7, and articulating means 9.

The connector 4 includes a first or hook/cable opening 11, a second or strap opening 13 formed as described herein, and a pair of connector legs 15 and 17. The opening 11 is dimensioned such that a hook 19 or a cable, as indicated by the phantom line referenced by the numeral 21 in FIG. 1, can be readily inserted therethrough. In an application of the present invention, the opening 11 is adapted to accept one of the cables 21 having a diameter of two inches.

Each of the connector legs 15 and 17 terminate in an end portion 23, each being generally annularly shaped with a 22 throughbore 25 about a common axis A—A, as shown in FIG. 1. Connecting means, such as a pin or bolt and locknut 27, are adapted to be slideably insertable through the bores 25, as shown in FIG. 1. A strut 28 extends transversely between the connector legs 15 and 17.

The retainer portion 7 generally has an eye portion 29 extending generally perpendicularly outwardly from a base portion 31. The eye portion 29 has an orifice 33. Preferably, the cross-section of the eye portion 29 has a generally circular profile, as indicated by the reference numeral 35 in FIG. 1. The base portion 31 is generally rigidly secured to a side-rail 37 of the vehicle 2, such as by a weld 39 or other suitable means.

It is to be understood that the retainer portion 7 may have any appropriate orientation desired, such as that shown in FIG. 2 wherein a plane 40, generally parallel to the eye portion 29, is aligned vertically with respect to the vehicle 2.

The articulating means 9 include a clevis 41 having clevis legs 43 which terminate in end portions 45, each being generally annularly shaped with a throughbore 47 for securement by the bolt and nut 27 such that the clevis 41 is pivotally connected to the connector 4 about the axis A—A, as shown in FIG. 1. The double articulation of the articulating means 9 facilitates folding the device 1 out of the way when not in use.

The strut has a side 49 which is spaced generally parallel to the axis A—A, as shown in FIG. 1. The side 49 and the end portions 45 are dimensioned and spaced apart such that a strap (not shown) can be readily inserted therebetween. In an application of the present invention, the minimal spacing between the side 49 and the end portions 45 is greater than 0.3 inches. Preferably, the side 49 is generally linear to minimize wear and tear on an (unshown) strap wrapped thereabout. For similar purposes, the hook/cable opening 11 has a side 51, which is spaced generally parallel to the side 49 for those applications in which an (unshown) strap is placed in contact with both of the sides 49 and 51 of the strut 28.

Preferably, the retainer portion 7, the clevis 41, and securement of the base portion 31 to the vehicle 2 are dimensioned and located such that the axis A—A is spaced in close proximity to the bed 53, but not such that the connector 4 and the clevis 41 bear against the vehicle 2 or the base portion 31, which might otherwise inhibit the benefits provided by the device 1 as herein described.

In order to distribute stresses at contact points between adjoining parts of the device 1, the curvatures of most of the cooperating surfaces of the device 1 are dimensioned similarly. As a result, such contacts are essentially "area"-type, as opposed to "point" or "line"-types, thus minimizing the potential for stress concentrations and plastic deformation of the materials.

The various components of the devices 1 are generally constructed of forged steel which is capable of withstanding the substantial forces and abusive environment which is characteristic of the applications described herein.

In an application of the present invention, a plurality of the devices 1 are generally spaced about a bed 53 of the vehicle 2 and tie-downs are connected therebetween as appropriate to bind the load 3 to the vehicle 2, either directly as suggested by the cable 21 as shown in FIG. 1, by a strap (not shown) inserted through the strap opening 13 between the strut 28 and the end portions 45, or by the use of the hooks 19 as shown in FIG. 2. As the load 3 is subsequently being transported, the load 3 may tend to shift, and the vehicle may flex, thereby inducing dynamic force components to be conveyed to the devices 1 by the interconnecting tie-downs.

In response to such newly created force components, the connector 4 and the clevis 41 of each of the devices 1 rotate about the respective eye portion 29 such that each of the devices 1 maintains relative alignment with the resultant force vector in its respective tie-down. As a result, stresses due to eccentrically applied loads, which might otherwise be created in the respective connector 4 and the clevis 41 by crisscross loading, shifting cargo 3, and vehicle flexing are avoided or minimized. Thus, the present invention provides a device which is capable of economically non-destructively adapting to the substantial eccentrically applied binding and dynamic substantial forces by reducing eccentricity in the tie-down device through its ability to align to the load by means of pivoting and articulating.

A modified articulated pivoting tie-down device, in accordance with the present invention, is shown in FIGS. 3 through 5, and is generally designated by the reference numeral 101. Many of the characteristics of the modified articulated pivoting tie-down device 101 are substantially similar to those previously described herein for the articulated pivoting tie-down device 1, and will not be reiterated here in detail.

The device 101 comprises a connector 103, retaining means 105, such as a retainer clip or portion 107, and articulating means 109. The connector 103 includes a first or hook/cable opening 111, a second or strap opening 113, and a pair of connector legs 115 and 117. Each of the connector legs 115 and 117 terminates in an end portion 123, each being generally annularly shaped and having a throughbore (not shown) about a common axis B—B, as shown in FIG. 3. Connecting means, such as a pin or bolt and locknut 127 is adapted to be slideably insertable through the end portions 123, as shown in FIG. 3.

The retainer portion 107 may either be a component of a vehicle 128 or may be provided as a component part of the present invention. The retainer portion 107 generally has a bore 129 extending longitudinally therethrough, as shown in FIG. 3. A base 131 of the retainer portion 107 is generally rigidly secured to a side-rail 133 of the vehicle 128, such as by a fillet weld 137 thereabout, or other suitable means.

The articulating means 109 include a link 139 and a clevis 141 having clevis legs 143 which terminate in end portions 145, each being generally annularly shaped and having a throughbore 147, as shown in FIG. 4, for securement by connecting means, such as a pin or bolt and locknut 149 such that the clevis 141 is pivotally connected to the retainer portion 107 about an axis C—C, as shown in FIG. 4. The connector 103 is connected to the clevis 141 by encircling the bolt 127 and the clevis 141 with the link 139 such that the clevis 141 and the connector 103 are generally operably co-planar, as indicated in FIGS. 3 and 5.

Preferably, the clevis 141, as it extends outwardly from the end portions 145, is generally semi-elliptical with its major axis oriented generally parallel to the axis C—C. Due to the elliptical shape of the clevis 141, repositioning of the link 139 and the connector 103 to maintain relative alignment with the resultant force vector, such repositioning shown in the extreme in FIG. 4, provides contact between the link 139 and the clevis 141 which is maintained in relatively close proximity to the axis C—C such that minimal stress is created in the retainer portion 107.

Preferably, the link 139 has an elliptical cross-section, as indicated by the reference numeral 155 in FIG. 4. The elliptical cross-section 155 generally facilitates movement of the link 139 along the clevis 141 in order to maintain relative alignment with the resultant force vector.

Preferably, the retainer portion 107, the clevis 141, and the securement of the retainer portion 107 to the vehicle 128 are dimensioned and located such that the connector 103 and the link 139 do not bear against the vehicle 128, as shown by the phantom lines referenced by the numeral 161 in FIG. 5, which might otherwise inhibit the benefits of the device 101 as herein described. The triple articulation of the device 101 provides ease in folding the device 101 out of the way when not in use.

In an application of the present invention, a plurality of the devices 101 are generally spaced about the vehicle 128 and tie-downs, as suggested by the phantom lines referenced by the numeral 157 in FIG. 3, are connected therebetween to bind cargo to the vehicle 128 as hereinbefore described. As the cargo is being transported, it may tend to shift and the vehicle may flex such that the ties 157 are subjected to additional, dynamic force components. In response to such additional force components, the link 139 and the connector 103 rotate about the clevis 141 such that stresses are minimized or avoided in the connector 103 and the link 139. Thus, by minimizing stress, the device 101 is capable of economic non-destructive adaptation to substantial eccentrically applied binding and dynamic loading.

It is understood that while certain forms of the present invention have been illustrated and described herein, it is not to be limited to the specific forms or arrangement of parts described and shown.

What is claimed and desired to be secured by Letters Patent is as follows:

1. A tie-down device for securing cargo to a vehicle with cable and strap tie-down, said device comprising:
   (a) a retainer portion adapted to be secured to the vehicle; said retainer portion having a generally horizontally oriented retainer portion throughbore;
   (b) a clevis having a pair of clevis legs end portions, each said clevis leg end portion having a clevis leg throughbore coaxial with the other; said clevis being generally semi-elliptically shaped with the major axis thereof generally parallel to said axis of said clevis leg throughbores;
   (c) a first pin inserted through said clevis leg throughbores and said retainer portion throughbore such that said clevis and said retainer portion are pivotally connected to each other about a common axis;
   (d) a connector having a first opening adapted to receive the cables of the cable tie-downs, and a second opening having a linear side adapted to receive the straps of the strap tie-downs; said connector having a pair of connector legs terminating in generally annularly shaped connector leg end portions, each said connector leg end portion having a connector leg throughbore coaxial with the other;
   (e) a second pin inserted through said connector leg throughbores; and
   (f) a link encircling said clevis and said second pin such that said connector and said clevis are pivotally connected to each other; and
   (g) wherein said connector and said link are adapted to operably and generally uninhibitedly pivot relative to said clevis in order to maintain relative alignment with resultant binding and dynamic force vectors, whether said vectors are vertical or horizontal or transverse or any orientation therebetween, induced by said cable or strap tie-downs, thereby reducing stress due to shifting of the cargo.

2. A tie-down device for securing cargo to a vehicle with cable and strap tie-downs with hooks, said device comprising:
   (a) a retainer portion adapted to be secured to the vehicle; said retainer portion having a generally horizontally oriented retainer portion throughbore;
   (b) a clevis having a pair of clevis legs terminating in generally annularly shaped clevis leg end portions, each said clevis leg end portion having a clevis leg throughbore coaxial with the other; said clevis being generally semi-elliptically shaped with the major axis thereof generally parallel to said axis of said clevis leg throughbores;
   (c) a first pin inserted through said clevis leg throughbores and said retainer portion throughbore such that said clevis and said retainer portion are pivotally connected to each other about a common axis;
   (d) a connector having a first opening adapted to receive the hooks of the tie-downs; said connector having a pair of connector legs terminating in generally annularly shaped connector leg end portions, each said connector leg end portion having a connector leg throughbore coaxial with the other;
   (e) a second pin inserted through said connector leg throughbores; and
   (f) a link encircling said clevis and said second pin such that said connector and said clevis are pivotally connected to each other; and
   (g) wherein said connector and said link are adapted to operably and generally uninhibitedly pivot relative to said clevis in order to maintain relative alignment with resultant binding and dynamic force vectors, whether said vectors are vertical or horizontal or transverse or any orientation therebetween, induced by said cable or strap tie-downs, thereby reducing stress due to shifting of the cargo.

* * * * *

UNITED STATES PATENT AND TRADEMARK OFFICE
CERTIFICATE OF CORRECTION

PATENT NO.    :   5,330,300
DATED         :   July 19, 1994
INVENTOR(S)   :   Leon Jones, et al.

It is certified that error appears in the above-identified patent and that said Letters Patent is hereby corrected as shown below:

In Column 3, line 25: delete "22".

In Claim 1, Column 5, line 65: delete "tie-down" and insert therefor --tie-downs-- .

In Claim 1, Column 6, line 1: after "legs" insert --terminating in generally annularly shaped clevis leg-- .

In Claim 2, Column 6, line 51: insert after "tie-downs" --, and a second opening having a linear side adapted to receive the straps of the strap tie-downs-- .

Signed and Sealed this

Thirteenth Day of December, 1994

Attest:

BRUCE LEHMAN

Attesting Officer     Commissioner of Patents and Trademarks